US012662165B2

(12) United States Patent
Seff et al.

(10) Patent No.: US 12,662,165 B2
(45) Date of Patent: Jun. 23, 2026

(54) TRAJECTORY PREDICTION BY SAMPLING SEQUENCES OF DISCRETE MOTION TOKENS

(71) Applicant: Waymo LLC, Mountain View, CA (US)

(72) Inventors: Ari Seff, Mountain View, CA (US); Rami Al-Rfou, Menlo Park, CA (US); Angelo Brian Cera, Mountain View, CA (US); Nigamaa Nayakanti, San Jose, CA (US); Aurick Qikun Zhou, San Francisco, CA (US); Mason Ng, Palo Alto, CA (US); Benjamin Sapp, Marina del Rey, CA (US); Dian Chen, Auxtin, TX (US); Khaled Refaat, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 165 days.

(21) Appl. No.: 18/600,159

(22) Filed: Mar. 8, 2024

(65) Prior Publication Data

US 2024/0300542 A1    Sep. 12, 2024

Related U.S. Application Data

(60) Provisional application No. 63/450,953, filed on Mar. 8, 2023.

(51) Int. Cl.
B60W 60/00 (2020.01)
B60W 50/00 (2006.01)

(52) U.S. Cl.
CPC .... B60W 60/0027 (2020.02); B60W 50/0097 (2013.01); B60W 2420/00 (2013.01); B60W 2554/4044 (2020.02)

(58) Field of Classification Search
CPC .... G06N 3/045; G06N 3/0442; G06N 3/0455; G06N 20/00; G06N 3/044; G06N 7/01;
(Continued)

(56) References Cited

U.S. PATENT DOCUMENTS 12,296,857 B2 *  5/2025  Afshar ............ B60W 60/00272
12,311,972 B2 *  5/2025  Pronovost ............ B60W 40/04
(Continued)

OTHER PUBLICATIONS

Hussein, Ahmed et al.. "Imitation Learning: A Survey of Learning Methods." Archived Mar. 6, 2020. URL: https://web.archive.org/web/20200306111131/https://www.open-access.bcu.ac.uk/5045/1/Imitation%20Learning%20A%20Survey%20of%20Learning%20Methods.pdf (Year: 2020).*
(Continued)

*Primary Examiner* — Hunter B Lonsberry
*Assistant Examiner* — Henry R Hinton
(74) *Attorney, Agent, or Firm* — Fish & Richardson P.C.

(57) ABSTRACT

Methods, systems, and apparatus, including computer programs encoded on a computer storage medium, for generating trajectory predictions for one or more agents in an environment. In one aspect, a method comprises: obtaining scene context data characterizing a scene in an environment at a current time point and generating a respective predicted future trajectory for each of a plurality of agents in the scene at the current time point by sampling a sequence of discrete motion tokens that defines a joint future trajectory for the plurality of agents using a trajectory prediction neural network that is conditioned on the scene context data.

20 Claims, 5 Drawing Sheets

US 12,662,165 B2

Page 2

(58) Field of Classification Search
CPC ........ G06N 3/092; G06N 3/088; G06N 3/008;
G06N 3/02; G06N 3/049; G06N 5/02;
G06N 3/0499; B60W 60/0027; B60W
2556/10; B60W 2556/00274; B60W
2554/4029; B60W 2556/40; B60W
60/00276; B60W 60/00272; G06V 10/82;
G06V 10/62; G05D 1/0088
See application file for complete search history.

(56) References Cited

U.S. PATENT DOCUMENTS

| | | | | |
|---|---|---|---|---|
| 2020/0159232 | A1* | 5/2020 | Refaat | G05D 1/0088 |
| 2022/0355825 | A1* | 11/2022 | Deo | G06N 3/0464 |
| 2023/0406360 | A1* | 12/2023 | Al-Rfou | B60W 40/04 |
| 2024/0101150 | A1* | 3/2024 | Pronovost | G06N 3/0475 |

OTHER PUBLICATIONS

Amirloo et al., "LatentFormer: Multi-agent-transformer based interaction modeling and trajectory prediction," CoRR, submitted on Mar. 3, 2022, arXiv:2203.01880v1, 10 pages.
Caesar et al., "nuscenes: A multimodal dataset for autonomous driving," In CVPR, 2020, p. 11621-11631.
Casas et al., "Implicit latent variable model for scene-consistent motion forecasting," CoRR, submitted on Jul. 23, 2020, arXiv:2007.12036v1, 44 pages.
Casas et al., "Intentnet: Learning to predict intention from raw sensor data," In Conference on Robot Learning, Oct. 23, 2018, p. 947-956.
Casas et al., "Spagnn: Spatially-aware graph neural networks for relational behavior forecasting from sensor data," CoRR, submitted on Oct. 18, 2019, arXiv:1910.08233v1, 11 pages.
Chai et al., "Multipath: Multiple probabilistic anchor trajectory hypotheses for behavior prediction," CoRR, submitted on Oct. 12, 2019, arXiv:1910.05449v1, 14 pages.
Chang et al., "Argoverse: 3d tracking and forecasting with rich maps," In Proceedings of the IEEE/CVF Conference on Computer Vision and Pattern Recognition, 2019, p. 8748-8757.
Cui et al., "Lookout: Diverse multi-future prediction and planning for self-driving," In Proceedings of the IEEE/CVF International Conference on Computer Vision, 2021, p. 16107-16116.
Cui et al., "Multimodal trajectory predictions for autonomous driving using deep convolutional networks," CoRR, submitted on Sep. 18, 2018, arXiv:1809.10732v2, 7 pages.
Engstrom et al., "Modeling road user response timing in naturalistic settings: a surprise-based framework," CoRR, submitted on Aug. 18, 2022, arXiv:2208.08651v2, 19 pages.
Ettinger et al., "Large scale interactive motion forecasting for autonomous driving: The waymo open motion dataset," CoRR, submitted on Apr. 20, 2021, arXiv:2104.10133v1, 15 pages.
Girgis et al., "Latent variable sequential set transformers for joint multi-agent motion prediction," CoRR, submitted on Feb. 19, 2021, arXiv:2104.00563v3, 26 pages.
Holtzman et al., "The curious case of neural text degeneration," CoRR, submitted on Apr. 22, 2019, arXiv:1904.09751v2, 16 pages.
Hong et al., "Rules of the road: Predicting driving behavior with a convolutional model of semantic interactions," In Proceedings of the IEEE/CVF Conference on Computer Vision and Pattern Recognition, 2019, p. 8454-8462.
Jaegle et al., "Perceiver: General perception with iterative attention," In ICML, Jul. 1, 2021, p. 4651-4664.
Jia et al., "Hdgt: Heterogeneous driving graph transformer for multi-agent trajectory prediction via scene encoding," CoRR, submitted on Apr. 30, 2022, arXiv:2205.09753v2, 15 pages.
Khandelwal et al., "What-if motion prediction for autonomous driving," CoRR, submitted on Aug. 24, 2020, arXiv:2008.10587v1, 16 pages.

Konev, "Mpa: Multipath++ based architecture for motion prediction," CoRR, submitted on Jun. 20, 2022, arXiv:2206.10041v1, 3 pages.
Lee et al., "Desire: Distant future prediction in dynamic scenes with interacting agents," In Proceedings of the IEEE conference on computer vision and pattern recognition, 2017, p. 336-345.
Lee et al., "Set transformer: A framework for attention-based permutation-invariant neural networks," In ICML, May 24, 2019, p. 3744-3753.
Liang et al., "Learning lane graph representations for motion forecasting," In European Conference on Computer Vision, 2020, p. 541-556.
Liu et al., "Deep structured reactive planning," CoRR, submitted on Jan. 18, 2021, arXiv:2101.06832v2, 15 pages.
Lu et al., "Kemp: Keyframe-based hierarchical end-to-end deep model for long-term trajectory prediction," CoRR, submitted on May 10, 2022, arXiv:2205.04624v1, 7 pages.
Luo et al., "Densetnt: efficient vehicle type classification neural network using satellite imagery," CoRR, submitted on Sep. 27, 2022, arXiv:2209.13500v1, 10 pages.
Luo et al., "JFP: Structured multi-agent interactive trajectories forecasting for autonomous driving," CoRR, submitted on Dec. 16, 2022, arXiv:2212.08710v1, 13pages.
Nash et al., "PolyGen: An autoregressive generative model of 3D meshes," International Conference on Machine Learning, Nov. 21, 2020, p. 7220-7229.
Nayakanti et al., "Wayformer: Motion forecasting via simple & efficient attention networks," CoRR, submitted on Jul. 12, 2022, arXiv:2207.05844v1, 20 pages.
Ngiam et al., "Scene transformer: A unified architecture for predicting future trajectories of multiple agents," CoRR, submitted on Jun. 15, 2021, arXiv:2106.08417v3, 25 pages.
Oord et al., "WaveNet: A generative model for raw audio," CoRR, submitted on Sep. 12, 2016, arXiv:1609.03499v2, 15 pages.
Ortega et al., "Shaking the foundations: delusions in sequence models for interaction and control," CoRR, submitted on Oct. 20, 2021, arXiv:2110.10819v1, 16 pages.
Rhinehart et al., "PRECOG: Prediction conditioned on goals in visual multi-agent settings," In Proceedings of the IEEE/CVF International Conference on Computer Vision, 2019, p. 2821-2830.
Robicquet et al., "Learning social etiquette: Human trajectory prediction in crowded scenes," In European Conference on Computer Vision (ECCV), 2020, 17 pages.
Ross et al., "A reduction of imitation learning and structured prediction to noregret online learning," In AISTATS, Jun. 14, 2011, p. 627-635.
Salzmann et al., "Trajectron++: Multi-agent generative trajectory forecasting with heterogeneous data for control," CoRR, submitted on Jan. 9, 2020, arXiv:2001.03093v1, 13 pages.
Shi et al., "Motion transformer with global intention localization and local movement refinement," Advances in Neural Information Processing Systems, Dec. 6, 2022, 35:6531-43.
Song et al., "PiP: Planning-informed trajectory prediction for autonomous driving," CoRR, submitted on Mar. 25, 2020, arXiv:2003.11476v2, 16 pages.
Sun et al., "M2I: From factored marginal trajectory prediction to interactive prediction," In Proceedings of the IEEE/CVF Conference on Computer Vision and Pattern Recognition (CVPR), 2022, p. 6543-6552.
Tang et al., "Multiple futures prediction," In Advances in neural information processing systems, 2019, 11 pages.
Tolstaya et al., "Identifying driver interactions via conditional behavior prediction," CoRR, submitted on Apr. 20, 2021, arXiv:2104.09959v2, 7 pages.
Varadarajan et al., "Multipath++: Efficient information fusion and trajectory aggregation for behavior prediction," CoRR, submitted on Nov. 29, 2021, arXiv:2111.14973v3, 22 pages.
Vaswani et al., "Attention is all you need," In Advances in Neural Information Processing Systems, 2017, 11 pages.
Yuan et al., "Agentformer: Agent-aware transformers for socio-temporal multi-agent forecasting," In Proceedings of the IEEE/CVF International Conference on Computer Vision, 2021, p. 9813-9823.

(56)　　　　　　　References Cited

OTHER PUBLICATIONS

Zhan, et al., "Interaction dataset: An international, adversarial and cooperative motion dataset in interactive driving scenarios with semantic maps," CoRR, submitted on Sep. 30, 2019, arXiv:1910. 03088v1, 13 pages.

Zhao et al., "Tnt: Target-driven trajectory prediction," In Conference on Robot Learning, Oct. 4, 2021, p. 895-904.

\* cited by examiner

TRAJECTORY PREDICTION SYSTEM <u>114</u>

300

OBTAIN SCENE CONTEXT DATA — 302

GENERATE MOTION TOKEN SEQUENCES DEFINING JOINT TRAJECTORIES OF AGENTS — 304

AGGREGATE JOINT TRAJECTORIES TO OBTAIN AGGREGATED TRAJECTORY MODES — 306

CONTROL AGENT BASED ON PREDICTED AGENT TRAJECTORIES — 308

TRAJECTORY PREDICTION BY SAMPLING SEQUENCES OF DISCRETE MOTION TOKENS

CROSS-REFERENCE TO RELATED APPLICATION

This application claims priority to U.S. Provisional Application No. 63/450,953, filed on Mar. 8, 2023. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle in the environment.

Predicting the future trajectories of agents is a task required for motion planning, e.g., by an autonomous vehicle.

Autonomous vehicles include self-driving cars, boats, and aircraft.

Autonomous vehicles use a variety of on-board sensors and computer systems to detect nearby objects and use such detections to make control and navigation decisions, e.g., by predicting the future trajectories of agents in the vicinity of the autonomous vehicles using the detections.

BRIEF DESCRIPTION OF THE DRAWINGS

Like reference numbers and designations in the various drawings indicate like elements.

DETAILED DESCRIPTION

Figure 1:
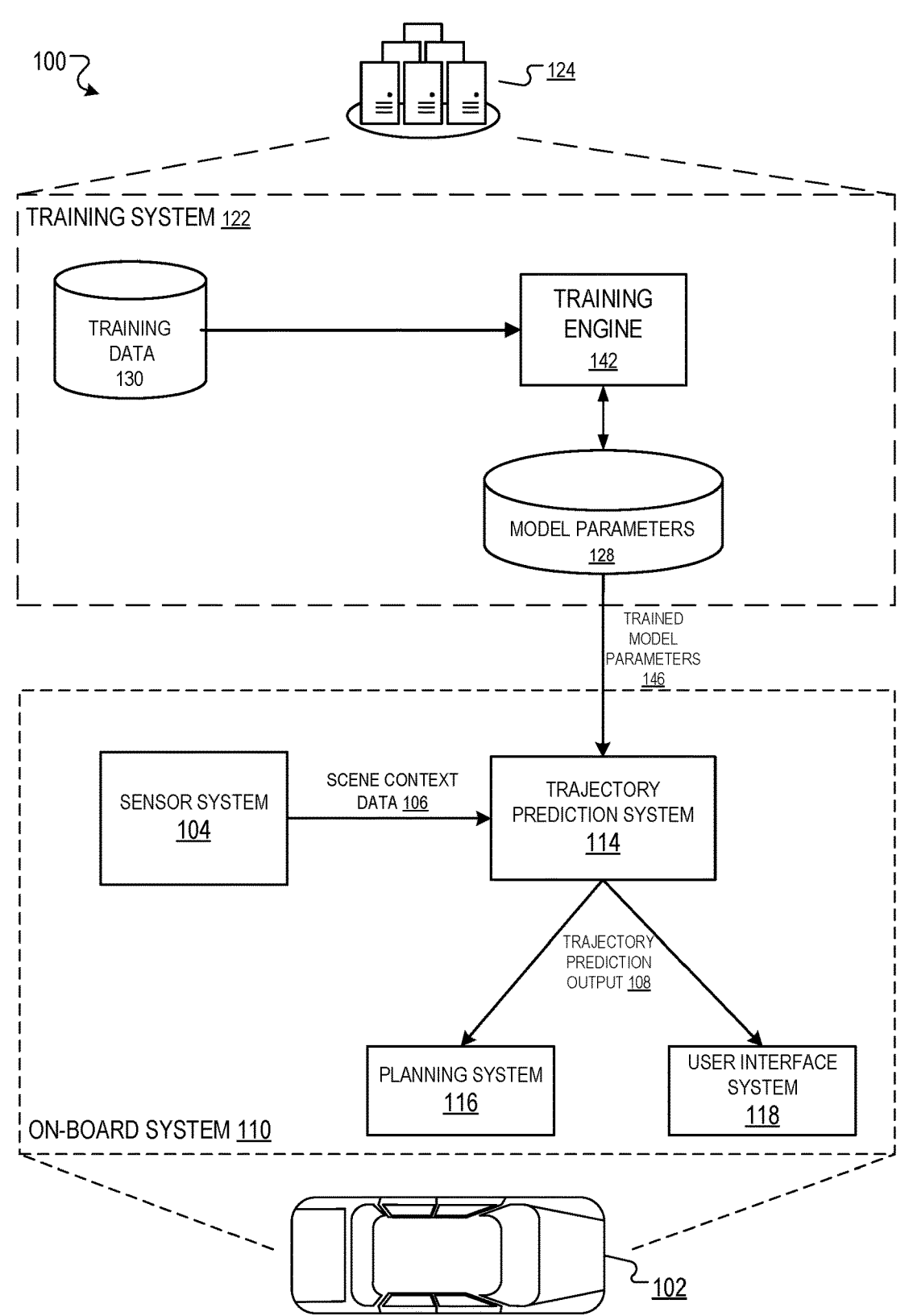
FIG. 1 illustrates an example trajectory prediction task.

This specification describes a system that generates trajectory predictions for one or more target agents, e.g., a vehicle, a cyclist, or a pedestrian, in an environment. Each trajectory prediction is a prediction that characterizes the future trajectories of the corresponding target agent starting from a current time point.

For example, the trajectory predictions may be made by an on-board computer system of an autonomous vehicle navigating through the environment and the target agents may be agents that have been detected by the sensors of the autonomous vehicle. The behavior predictions can then be used by the on-board system to control the autonomous vehicle, i.e., to plan the future motion of the vehicle based in part on the likely future motion of other agents in the environment.

As another example, the trajectory predictions may be made in a computer simulation of a real-world environment being navigated through by a simulated autonomous vehicle and the target agents. Generating these predictions in simulation may assist in controlling the simulated vehicle, in testing the realism of certain situations encountered in the simulation, and in ensuring that the simulation includes surprising interactions that are likely to be encountered in the real-world. More generally, generating these predictions in simulation can be part of testing the control software of a real-world autonomous vehicle before the software is deployed onboard the autonomous vehicle, of training one or more machine learning models that will layer be deployed on-board the autonomous vehicle or both.

As used in this specification, a future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point.

The described systems approach trajectory prediction as an auto-regressive token prediction task, similar to auto-regressive token prediction for language processing tasks. In particular, the described systems represent the trajectories of multiple agents as sequences of discrete motion tokens and can directly predict joint future trajectories for the agents (e.g., predict trajectories for multiple agents that can depend on one another) by predicting sequences of motion tokens that represent the predicted trajectories.

Conventional methods for trajectory prediction often only predict marginal trajectories for multiple agents (e.g., predict individual trajectories for each agent in isolation) and approximate joint trajectory prediction using interaction heuristics. Conventional methods can therefore generate inaccurate predictions for the joint behavior of interacting agents.

By auto-regressively generating sequences of motion tokens to predict future trajectories, the described systems can learn to predict multiple diverse trajectories while avoiding mode collapse. Conventional methods for trajectory prediction require the use of latent variables or pre-defined anchor trajectories to avoid mode collapse. Unlike conventional methods, the described systems can predict multiple diverse trajectories by directly sampling sequences of motion tokens for the trajectories, without using latent variables or pre-defined anchor trajectories.

The described systems can predict the trajectories of multiple agents by directly modeling a joint distribution of the multiple agent trajectories and by sampling motion tokens for the multiple agents according to the joint distribution. Conventional methods for trajectory prediction often predict multiple agent trajectories by sampling individual marginal trajectories for each agent separately and applying post-hoc interaction heuristics adjust the individually sampled trajectories. Unlike conventional methods, the described systems can directly predict and sample from the joint distributions for multiple agents.

The described systems can also predict multiple agent trajectories while following temporally causal inference. In particular, the described systems can perform temporally causal inference by enforcing certain constraints while auto-regressively generating the discrete motion token sequences for the multiple agents. Unlike conventional methods, which might only learn correlations between agent behaviors (e.g., that a lead vehicle decelerating is correlated with a trailing vehicle decelerating), the described systems can learn causal relationships between agent trajectories (e.g., that a lead vehicle decelerating causes a trailing vehicle to decelerate). The described systems can therefore produce more realistic trajectory predictions that are safer to use for autonomous vehicle control compared to conventional methods.

The described systems can utilize Transformer architectures to perform agent trajectory prediction. The Transformer architecture enables parallel processing of multiple trajectory predictions. The described systems can therefore process multiple trajectory predictions in parallel, both for training and for inference.

FIG. 1 illustrates an example trajectory prediction task in which an on-board system 110 for a vehicle 102 predicts the trajectories of agents around the vehicle 102.

The on-board system 110 is located on-board the vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes a sensor system 104 which enables the on-board system 110 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data, which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 110 can process the raw sensor data to generate scene context data 106.

The scene context data 106 characterizes a scene in an environment, e.g., an area of the environment that includes the area within a threshold distance of the autonomous vehicle or the area that is within range of at least one sensor of the vehicle.

Generally, the scene context data 106 includes multiple modalities of features that describe the scene in the environment. A modality, as used in this specification, refers to a feature that provides a particular type of information about the environment. Thus, different modalities provide different types of information about the environment. For example, the scene context data 106 can include features from two or more of the following modalities: a traffic light state modality that provides information about a traffic light state of traffic lights in the environment, a road graph data modality that provides static information about the roadways in the environment, an agent history modality that provides information about the current and previous positions of agents in the environment, and an agent interaction modality that provides information about interactions between agents in the environment In some examples, the context data 106 includes raw sensor data generated by one or more sensors from the sensor system 104. In some examples, the context data includes data that has been generated from the outputs of an object detector that processes the raw sensor data from the sensor system 104.

At any given time point, the on-board system 110 can process the scene context data 106 using a trajectory prediction system 114 to predict the trajectories of agents (e.g., pedestrians, bicyclists, other vehicles, and the like) in the environment in the vicinity of the vehicle 102.

In particular, the on-board system 110 can generate a respective trajectory prediction output 108 for each of one or more target agents in the scene at the given time point. The trajectory prediction output 108 for a target agent predicts the future trajectory of the target agent after the current time point.

The future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point. The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The processing performed by the trajectory prediction system 114 to generate the trajectory prediction output 108 is described in further detail below with reference to FIGS. 2 and 3.

The on-board system 110 can provide the trajectory prediction output 108 generated by the trajectory prediction system 114 to a planning system 116, a user interface system 118, or both.

When the planning system 116 receives the trajectory prediction output 108, the planning system 116 can use the trajectory prediction output 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the predicted future trajectory of the agent. In a particular example, the on-board system 110 may provide the planning system 116 with trajectory prediction output 108 indicating that another vehicle which is attempting to merge onto a roadway being travelled by the vehicle 102 is unlikely to yield to the vehicle 102. In this example, the planning system 116 can generate fully-autonomous control outputs to apply the brakes of the vehicle 102 to avoid a collision with the merging vehicle. The fully-autonomous or partly-autonomous driving decisions generated by the planning system 116 can be implemented by a control system of the vehicle 102. For example, in response to receiving a fully-autonomous driving decision generated by the planning system 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface system 118 receives the trajectory prediction output 108, the user interface system 118 can use the trajectory prediction output 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 110 may provide the user interface system 118 with trajectory prediction output 108 indicating that another vehicle which is attempting to merge onto a roadway being travelled by the vehicle 102 is unlikely to yield to the vehicle 102. In this example, the user interface system 118 can present an alert message to the driver of the vehicle 102 with Instructions to adjust the trajectory of the vehicle 102 to avoid a collision with the merging vehicle.

The trajectory prediction system 114 can include one or more trajectory prediction machine learning models configured to perform trajectory prediction. Prior to the on-board system 110 using the trajectory prediction system 114 to make predictions, a training system 122 can determine trained model parameters 146 for the trajectory prediction machine learning models of the system 114.

The training system 122 is typically hosted within a data center 124, which can be a distributed computing system having hundreds or thousands of computers in one or more locations.

The training system 122 can train trajectory prediction machine learning models for the trajectory prediction system 114 using training data 130 of the system 122. The training data 130 generally includes example scene context data 106. The training data 130 may be obtained from real or simulated driving data logs.

The training data 130 can include data from multiple different modalities. In some cases the training data 130 includes raw sensor data generated by one or more sensors, e.g., a camera sensor, a lidar sensor, or both. In other cases, the training data 130 includes data that has been generated from the outputs of an object detector that processes the raw sensor data.

The training engine 142 trains the trajectory prediction machine learning models for the trajectory prediction system 114 to update model parameters 128 by optimizing an objective function based on ground truth trajectories for each agent, e.g., an objective function that measures likelihoods of the ground truth trajectories according to the trajectory prediction machine learning models, as described in more detail below with reference to FIG. 2.

After training the trajectory prediction machine learning models, the training system 122 can send the trained model parameters 146 to the trajectory prediction system 114, e.g., through a wired or wireless connection.

While this specification describes that the trajectory prediction output 108 is generated on-board an autonomous vehicle, more generally, the described techniques can be implemented on any system of one or more computers that receives images of scenes in an environment. That is, once the training system 122 has trained the trajectory prediction system 114-A, the trained system 114-A can be used by any system of one or more computers.

As one example, the trajectory prediction output 108 can be generated on-board a different type of agent that has sensors and that interacts with objects as it navigates through an environment. For example, the trajectory prediction output 108 can be generated by one or more computers embedded within a robot or other agent.

As another example, the trajectory prediction output 108 can be generated by one or more computers that are remote from the agent and that receive images captured by one or more camera sensors of the agent. In some of these examples, the one or more computers can use the trajectory prediction output 108 to generate control decisions for controlling the agent and then provide the control decisions to the agent for execution by the agent.

As another example, the trajectory prediction output 108 can be generated by one or more computers that are remote from the agent and that receive images captured by one or more camera sensors of the agent. In some of these examples, the one or more computers can use the trajectory prediction output 108 to generate control decisions for controlling the agent and then provide the control decisions to the agent for execution by the agent.

Figure 2:
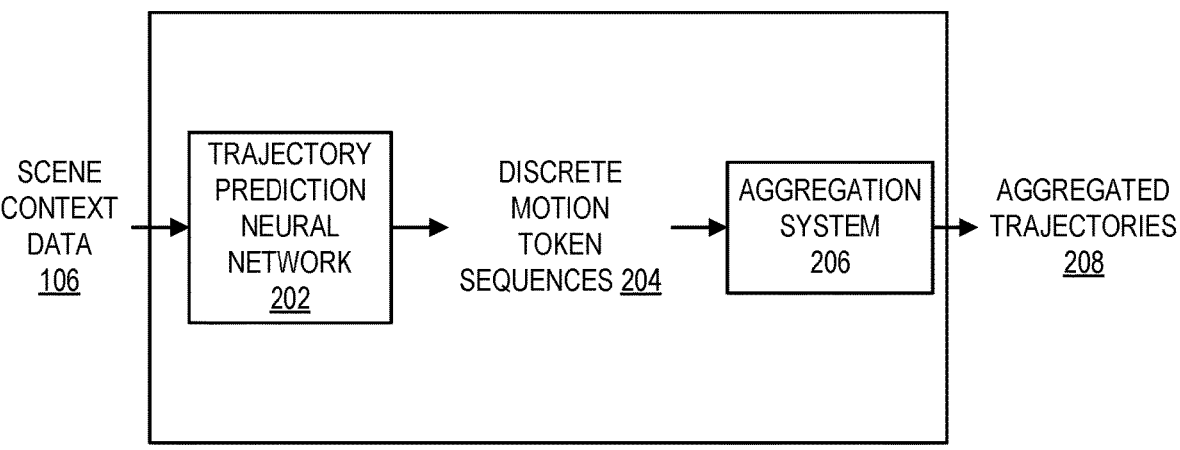
FIG. 2 shows a block diagram of an example trajectory prediction system.

FIG. 2 is a block diagram of an example trajectory prediction system 114.

The trajectory prediction system 114 includes a trajectory prediction neural network 202.

The trajectory prediction neural network 202 can process scene context data 106 to generate predicted future trajectories for each of one or more target agents of the plurality of agents in the environment. A predicted future trajectory for a given target agent specifies predicted states for the target agent (e.g., locations, headings, velocities, accelerations, etc., for the target agent) at one or more future time points. In particular, the trajectory prediction neural network 202 can predict joint future trajectories for the target agents. A predicted joint future trajectory for the target agents specifies predicted states for each of the target agents at one or more future time points.

The trajectory prediction neural network 202 can generate sequences of discrete motion tokens 204 that represent the predicted future trajectories. Each sequence of discrete motion tokens 204 can include, for each of the target agents and at each of a plurality of time points, a respective discrete motion token defining a predicted agent state for the target agent at the time points for the motion token.

Each sequence of discrete motion tokens 204 can follow an ordering of the motion tokens for the sequence. For example, the ordering for the sequences of discrete motion tokens 204 can be based on orderings of the time points and orderings of the target agents for the discrete motion tokens. As a further example, the ordering for the sequences of motion tokens 204 can order the motion tokens for the sequence first by target agent and then by time point, such that (i) discrete motion tokens for earlier target agents (with respect to an ordering of the target agents) are included within the sequences of discrete motion tokens 204 before discrete motion tokens for later target agents and (ii) the discrete motion tokens for each target agent are ordered with respect to the time points for the target agents. As another example, the ordering for the sequences of motion tokens 204 can order the motion tokens for the sequence first by time point and then by target agent, such that (i) discrete motion tokens for earlier time points are included within the sequences of discrete motion tokens 204 before discrete motion tokens for later time points and (ii) the discrete motion tokens for each time point are ordered with respect to an ordering for the target agents.

The trajectory prediction neural network 202 can generate the sequences of discrete motion tokens 204 following the ordering of motion tokens for the sequences. In particular, the trajectory prediction neural network 202 can generate earlier discrete motion tokens (with respect to the ordering of motion tokens for the sequences 204) before generating later discrete motion tokens. When the trajectory prediction neural network 202 generates a given motion token, the trajectory prediction neural network 202 can generate the given motion token based on the previously generated motion tokens (e.g., by including previously generated motion tokens as a network input for generating the given motion token).

Each respective predicted agent state can include a predicted two-dimensional waypoint location for a corresponding agent at a corresponding future time point. Each discrete motion token can be associated with a respective value or delta value for each of the two dimensions of a waypoint location. As an example, each discrete motion token can include the waypoint location value or delta value associated with the discrete motion token. As another example, each discrete motion token can include an embedding of the waypoint location value or delta value associated with the discrete motion token. As another example, each discrete motion token can include a key that specifies (e.g., by a table lookup) the waypoint location value or delta value associated with the discrete motion token.

The trajectory prediction network 202 can store a token vocabulary that defines a set of discrete motion tokens. The trajectory prediction neural network 202 can produce each sequence of discrete motion tokens 204 by selecting each discrete motion token in the sequence 204 from the token vocabulary 408.

In some implementations, the token vocabulary defines a set of motion tokens that each correspond to a different delta (e.g., a change) to be applied to a preceding agent state. Each discrete motion token within a sequence of discrete motion tokens 204 can specify a delta to be applied to an agent state for a particular agent at a time preceding the time point for the motion token.

Each sequence of discrete motion tokens 204 can autoregressively encode a corresponding joint future trajectory for the target agents. The trajectory prediction system 114 can determine the joint future trajectory represented by one of the sequence of discrete motion tokens 204 by autoregressively decoding the motion tokens of the sequence. In particular, the trajectory prediction system can decode the motion tokens following the ordering of motion tokens for the sequence (e.g., by decoding motion tokens that are earlier in the sequence, with respect to the ordering for the sequence, before later motion tokens in the sequence). When the trajectory prediction system 114 decodes a given motion token, the system can determine the state of the agent for the motion token at the time point for the motion token based on previously decoded agent states or motion tokens. For example, when the motion tokens correspond to deltas in target agent locations, the system can decode a particular motion token for a target agent and a time point to first determine a location delta for the target agent at the time point and then determine the location of the target agent at the time point by combining the location delta for the motion token with a location for the target agent determined by decoding previous motion tokens for the target agent.

The trajectory prediction neural network 202 is described in more detail below with reference to FIG. 4. An example process of generating the sequence of discrete motion tokens 204 using the trajectory prediction neural network 202 is described in more detail below with reference to FIG. 5.

In some implementations, the trajectory prediction system 114 can generate multiple different sequences of discrete motion tokens 204 based on the same scene context data 106. When the trajectory prediction neural network 202 generates multiple predicted sequence of discrete motion tokens 204 based on the same scene context data 106, each sequence of discrete motion tokens 204 can define a distinct corresponding joint future trajectory for the target agents conditioned on the scene context data 106.

The trajectory prediction system 114 can include an aggregation system 206. The aggregation system 206 can receive multiple sequences of discrete motion tokens 204 and generate one or more predicted trajectory modes. The aggregation system can generate the predicted trajectory modes by clustering the sequences of discrete motion tokens 204 based on a measure of similarity for the predicted trajectories represented by the sequences 204. In general, each of the predicted trajectory modes represents a respective collection (e.g., a cluster) of similar joint agent trajectories (e.g., with respect to the measure of similarity for the predicted trajectories).

The aggregation system 206 can also assign a respective probability for each of the generated predicted trajectory modes. In particular, the assigned probability for a given predicted trajectory mode can represent a predicted probability that the target agents will follow a trajectory represented by the given trajectory mode (e.g., a predicted probability that the real future trajectory of the target agents would be assigned to the given trajectory mode).

An example process for aggregating multiple predicted future trajectories into a collection of predicted trajectory modes is described in more detail below with reference to FIG. 3.

Figure 3:
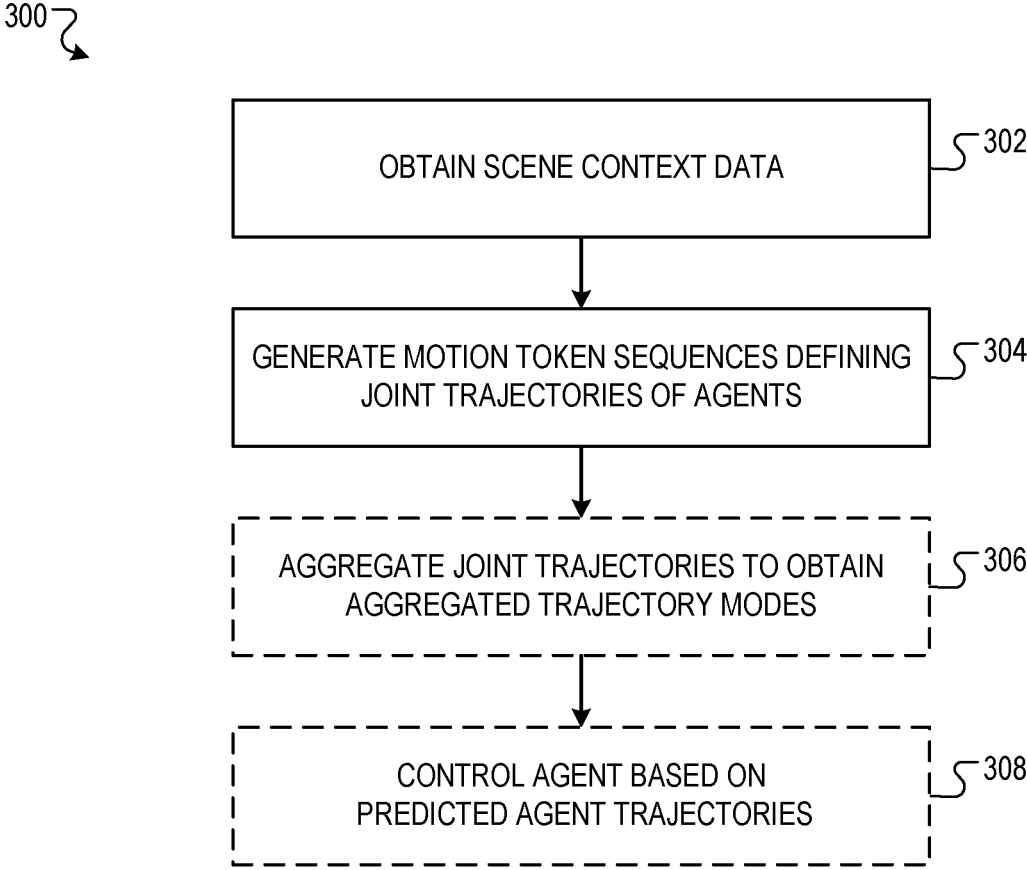
FIG. 3 is a flow diagram of an example process for trajectory prediction.

FIG. 3 is a flow diagram of an example process 300 for trajectory prediction. For convenience, the process 300 will be described as being performed by a system of one or more computers located in one or more locations. For example, an on-board system, e.g., the on-board system 110 of FIG. 1, appropriately programmed in accordance with this specification, can perform the process 300.

The system obtains scene context data characterizing a scene in an environment at a current time point (step 302). For example, the scene context data can characterize an area of the environment within a vicinity around an autonomous vehicle. As a further example, the scene context data can include data generated from data captured by one or more sensors of the autonomous vehicle. The context data may characterize any of a variety of observations regarding the environment, e.g., LIDAR data, RADAR data, images from camera sensors, etc.

The system then generates a sequence of discrete motion tokens that defines a joint future trajectory for the plurality of agents (step 304). The system generates the sequence of discrete motion tokens using a trajectory prediction neural network as conditioned on the scene context data. An example process of generating the sequence of discrete motion tokens is described in more detail below with reference to FIG. 5.

In some implementations, the system can generate one or more additional sequences of discrete motion tokens that each define a respective additional joint future trajectory for the plurality of agents. The system can generate the one or more additional sequences of discrete motion tokens using the trajectory prediction neural network as conditioned on the scene context data.

In some implementations, the system leverages model ensembling to account for epistemic uncertainty and further improve the quality of the predictions, combining rollouts from independently trained replicas prior to the aggregation step.

When the system generates multiple sequences of discrete motion tokens, the system can aggregate the joint future trajectories defined by the generated sequences of discrete motion tokens (step 306). As part of aggregating the joint future trajectories, the system can generate (i) multiple predicted trajectory modes and (ii) a respective probability for each of the predicted trajectory modes.

As an example, the system can assign each of N predicted joint trajectories for the target agents, $\{\vec{x}_1(t), \ldots, \vec{x}_N(t)\}$, to one of a set M predicted trajectory modes, $\{C_1, \ldots, C_M\}$. The system can determine embedded representations, $\{\vec{z}_1, \ldots, \vec{z}_N\}$, for each of the predicted joint trajectories. The embedded representations can be any of a variety of numerical representations of the predicted joint trajectories. For example, the embedded representations may be the predicted joint trajectories themselves, values of the motion tokens defining the predicted joint trajectories, the results of applying a transformation, e.g., applying an embedding neural network, to the predicted joint trajectories, etc.

The system can generate the set of predicted trajectory modes by clustering the embedded representations. For example, the system can perform K-means clustering of the embedded representations.

As another example, the system can generate the set of predicted trajectory modes by modeling a probability distribution characterizing the predicted joint trajectories. For example, the system can determine a mixture model for the embedded representations, identifying a probability distribution of the form:

$$p(\vec{z}) = \sum_{i=1}^{M} A_i p_i(\vec{z})$$

Where $p_i(\vec{z})$ is the i-th component distribution that corresponds to the i-th trajectory mode, $C_i$, and where each $A_i$ is a normalization constant such that $$\sum_{i=1}^{M} A_i = 1.$$

The aggregation system can return the normalization constants, $\{A_1, \ldots, A_M\}$, as the probabilities of the corresponding trajectory modes. In particular, the aggregation system can determine a Gaussian Mixture Model (GMM) for the embedded representations, for which each component distribution is a Gaussian distribution.

The system can determine the mixture model for the embedded representations by any of a variety of methods. For example, the system can fit the mixture model following an Expectation-Maximization procedure. As another example, the system can determine the mixture model following a non-maximum suppression (NMS) aggregation scheme, such as described by Varadarajan et al. in "MultiPath++: Efficient Information Fusion and Trajectory Aggregation for behavior Prediction".

In some implementations, the system can control an autonomous vehicle based on the respective predicted future trajectories of the plurality of agents (step 308). For example, the system can process the predicted future trajectories using a planning system to make fully-autonomous or partly-autonomous driving decisions. As a further example, the system can generate a fully-autonomous plan to navigate the autonomous vehicle that makes any of a variety of changes to the future trajectory of the autonomous vehicle. The changes may, for example, include turning the vehicle, accelerating the vehicle, decelerating the vehicle, etc. The system can plan the changes to the future trajectory of the autonomous vehicle to accomplish a variety of tasks, such as avoiding a collision with other vehicles, navigating to a destination, and so on.

Figure 4:
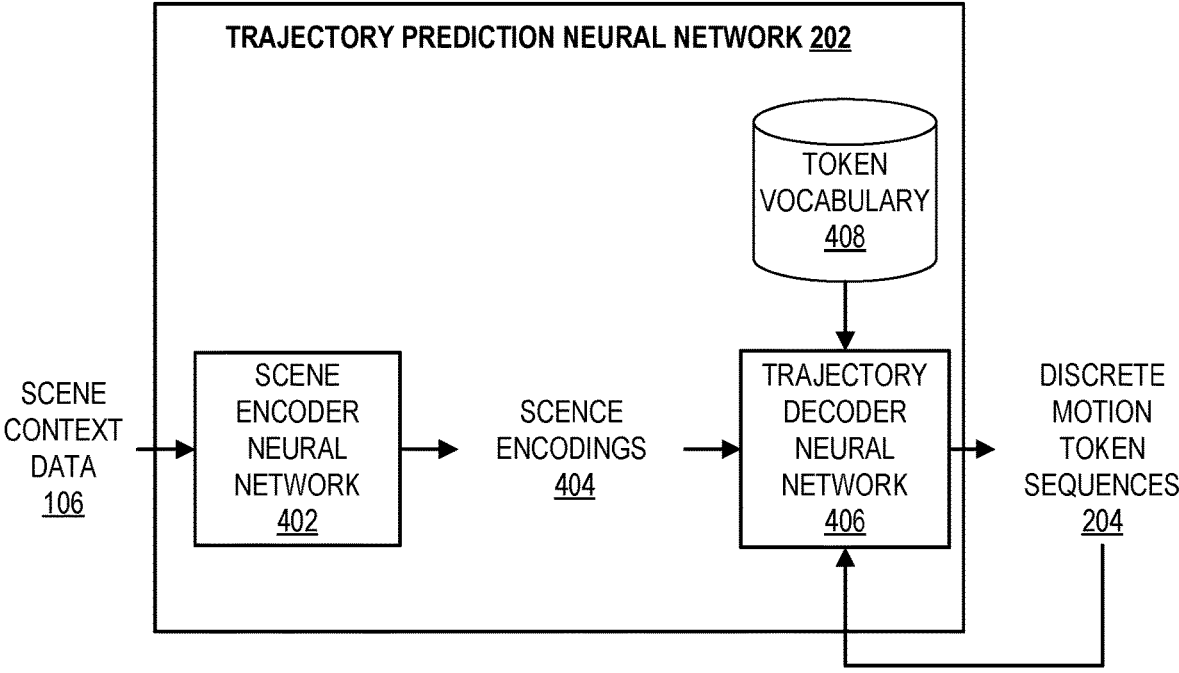
FIG. 4 shows a block diagram of an example trajectory prediction neural network.

FIG. 4 shows a block diagram of an example trajectory prediction neural network 202.

As described above, the trajectory prediction neural network 202 can receive and process scene context data 106 to produce sequences of discrete motion tokens 204. The trajectory prediction network 202 can store a token vocabulary 408. The token vocabulary 408 defines a set of discrete motion tokens. In some implementations, the trajectory prediction neural network 202 can produce each sequence of discrete motion tokens 204 by selecting each discrete motion token in the sequence 204 from the token vocabulary 408.

A future trajectory for an agent can define, for a sequence of future time points, a respective predicted agent state for the agent at each future time point. Each sequence of discrete motion tokens 204 can include a respective discrete motion token at each of a plurality of time points, where each discrete motion token defines a predicted agent state for a corresponding agent at the future time point for the motion token.

In some implementations, the token vocabulary 408 defines a set of motion tokens that each correspond to a different delta (e.g., a change) to be applied to a preceding agent state. Each discrete motion token within a sequence of discrete motion tokens 204 can specify a delta to be applied to an agent state for a particular agent at a time preceding the time point for the motion token.

Each respective predicted agent state can be a predicted two-dimensional waypoint location for a corresponding agent at a corresponding future time point. Each discrete motion token can be associated with a respective value or delta value for each of the two dimensions of a waypoint location. As an example, each discrete motion token can include the waypoint location value or delta value associated with the discrete motion token. As another example, each discrete motion token can include an embedding of the waypoint location value or delta value associated with the discrete motion token. As another example, each discrete motion token can include a key that specifies (e.g., by a table lookup) the waypoint location value or delta value associated with the discrete motion token.

The trajectory prediction neural network 202 can include a scene encoder neural network 402. The scene encoder neural network 402 can process scene context data 102 to produce corresponding scene encodings 404. The scene encodings 404 are numerical representations of the corresponding scene context data 102 that characterize contents of the scene content data 102.

The scene encoder neural network 402 can have any neural architecture appropriate for generating one or more encodings of the scene context data 102. As an example, if the scene context data 102 includes image data, the scene encoder neural network 402 can include component networks appropriate for processing and generating encodings of image data, e.g., convolutional neural networks (CNNs), visual Transformers, etc. As another example, if the scene context data 102 includes time-series data (e.g., data collected across multiple time points), the scene encoder neural network 402 can include component networks appropriate for processing and generating encodings of time-series data, e.g., recurrent neural networks (RNNs), Transformers, etc.

The scene context data 102 can include data from multiple modalities (e.g., image data, point cloud data, video data, etc.). When the scene context data 102 includes multiple modalities, the scene encoder neural network 402 can perform data fusion across the multiple modalities in order to produce the scene encodings 404. As an example, the scene encoder neural network 402 can perform data fusion across the multiple modalities by generating an encoding for each of the modalities within the scene context data 102, concatenating the generated encodings to form a combined encoding, and returning the combined encoding as a scene encoding 404. As a further example, the scene encoder neural network 402 can generate the scene encoding 404 by processing a concatenated input that includes the generated encodings for each modality using an attention mechanism. As a particular example, the scene encoder neural network 402 can apply cross-attention between the generated encodings for the modalities and a set of learned latent vectors, as described by Jaegle et al. in "Perceiver: General Perception with Iterative Attention".

When the scene encoder neural network 402 generates an encoding for each modality within the scene context data 102, the network 402 can, prior to performing data fusion, project each generated encoding to have a common dimensionality. The scene encoder neural network 402 can use any appropriate mechanism for projecting the generated encodings for the multiple modalities into a common methodology. For example, the scene encoder neural network 402 can learn a corresponding projection matrix for each modality and can project the encoding of each modality by multiplying the encoding with the corresponding projection matrix. As another example, the scene encoder neural network 402 can project encodings following the relation:

$$p_i = \sigma(W_i e_i + b_i)$$

Where $p_i$ is a projection of encoding e; for the i-th modality, $\sigma$ is an activation function (e.g., ReLU, GeLU, etc.), $W_i$ is a learned matrix for the i-th modality, and $b_i$ is a learned vector for the i-th modality.

In some implementations, the scene encoder neural network 402 can process the scene context data 102 and generate a respective scene encoding for each of the target agents. The scene encoder neural network 402 can generate an agent-specific scene encoding for one of the target agents by appropriately encoding information specific to the target agent within the agent-specific scene encoding. In some implementations, the scene encoder neural network 402 can process the scene context data 102 and extract features with respect to a frame of reference of a particular target agent (e.g., the state of the particular target agent, characterizations of the environment from the perspective of the particular target agent, observed trajectories of other agents relative to that of the particular target agent, etc.) to generate agent-specific scene context data. The scene encoder neural network 402 can process the agent-specific scene context data to generate the respective agent-specific scene encoding. The scene encoder neural network 404 can generate a scene encoding 404 for predicting future joint trajectories of the target agents based on the generated agent-specific scene encodings by concatenating the agent-specific scene encodings.

The scene encoder neural network 402 can include within the scene encodings 404 any embedding appropriate for characterizing each of the encodings 404. For example, the scene encoder neural network 402 can include a temporal embedding within the scene encodings 404 that characterizes time points for each of the encodings 404. As another example, the scene encoder neural network 402 can include an agent identity embedding within the scene encodings 404 that characterizes the particular agents of agent-specific encodings 404.

The trajectory prediction neural network 202 can include a trajectory decoder neural network 406. The trajectory decoder neural network 406 can process the scene encodings 404 to produce the sequence of discrete motion tokens 204. In some implementations, the trajectory decoder neural network 406 can produce the sequence 204 by selecting discrete motion tokens from the token vocabulary 408.

The trajectory decoder neural network 406 can iterate over a sequence of time steps to generate the sequence of discrete motion tokens 204 for a sequence of future time. Each time step for the generation of the sequence 204 can be associated with: (i) a time point of the trajectory to be predicted at the time step and (ii) a sequence of time points of the trajectory preceding the time point to be predicted at the time step.

At each time step, the trajectory decoder neural network 406 can process an input sequence that contains discrete motion tokens, as generated at previous time steps, for the sequence of preceding time points. The trajectory decoder neural network 406 can process the input sequence for the time step conditioned on the scene encoding 404 to generate a score distribution over the token vocabulary 408. The trajectory decoder neural network 406 can then sample a discrete motion token from the generated score distribution for the time step.

The trajectory decoder neural network 406 can return the discrete motion tokens sampled for all of the time steps as the sequence of discrete motion tokens 204.

The trajectory decoder neural network 406 can have any neural architecture appropriate for processing the scene encodings 404 and generating the sequences of discrete motion tokens 204. As an example, trajectory decoder neural network 406 can be a recurrent model, e.g., an RNN, an LSTM, etc. As another example, the trajectory decoder neural network 406 can have a Transformer architecture.

The trajectory decoder neural network 406 can generate the sequences of discrete motion tokens 204 by transforming sequences of motion tokens using attention mechanisms. For example, the trajectory decoder neural network 406 can include self-attention layers that apply self-attention over sequences of motion tokens. While generating the sequence of discrete motion tokens 204, the trajectory decoder neural network 406 can, at each time step, process and transform the sequence of preceding motion tokens using the self-attention layers. The trajectory decoder neural network 406 can include cross-attention layers that apply cross-attention with the scene encoding 404 to sequences of motion tokens. While generating the sequence of discrete motion tokens 204, the trajectory decoder neural network 406 can, at each time step, process and transform the sequence of preceding motion tokens conditioned on the respective scene encoding 404 for the time step using the cross-attention layers.

For certain applications, it may be desirable that the trajectory prediction neural network 202 learns to predict each time point of a trajectory based only on the information available prior to the time point. To avoid relying on information from later time points, the trajectory prediction neural network 202 can follow temporal causality such that the discrete motion tokens at each particular time step are sampled conditioned only on discrete motion tokens corresponding to time points prior to the particular time point. When the trajectory prediction neural network 202 includes attention mechanisms (e.g., self-attention and cross attention layers for the scene encoder neural network 402 and the trajectory decoder neural network 406), the trajectory prediction neural network 202 can implement temporally causal conditioning by masking certain inputs to the attention mechanisms. In particular, when producing a layer output for a certain time point using an attention layer, the trajectory prediction neural network 202 can mask all inputs to the layer corresponding to time points occurring later than the certain time point of the output such that the inputs for the later time points have no effect on the computation of the layer output.

The trajectory prediction neural network 202 can predict the trajectories of multiple target agents conditioned on planned trajectories for one or more conditioning agents using temporally causal conditioning. The trajectory prediction neural network 202 can receive the planned trajectories for the conditioning agents in addition to the scene context data 106. The trajectory prediction neural network 202 can generate corresponding sequences of discrete motion tokens for each of the planned trajectories be determining sequences of discrete motion tokens that correspond to agent trajectories that reproduce the planned trajectories (e.g., minimize displacements from the planned trajectories). The trajectory decoder neural network 406 can then predict sequences of discrete motion tokens for both the target and conditioning agents as described above.

When the trajectory decoder neural network 406 predicts motion tokens for target and conditioning agents, the trajectory decoder neural network 406 can implement temporally causal conditioning by fixing the motion tokens for the conditioning agents to be corresponding motion tokens from the sequence of discrete motion tokens for the planned trajectories of the conditioning agents. In particular, to predict motion tokens for the target agents at a given time point, the trajectory decoder neural network 406 can process (i) predicted motion tokens for the target agents generated by the network 406 for previous time points and (ii) motion tokens for the conditioning agents for the previous time points determined based on the planned trajectories. By fixing motion tokens for the conditioning agents to be motion tokens for the conditioning agents' planned trajectories, the trajectory decoder neural network 406 can produce sequences of motion tokens for the target agents conditioned on the planned trajectories of the conditioning agents.

As an example, a trajectory planning system of an autonomous vehicle (e.g., the planning system 116 of FIG. 1) can generate candidate planned trajectories for the autonomous vehicle within an environment. The system can use the trajectory prediction neural network 202 to model joint trajectories of the autonomous vehicle and other agents within the environment. The system can use temporally causal conditioning to predict how the candidate planned trajectories for the autonomous vehicle will influence the trajectories of the other agents and can use the predicted effects as part of selecting a planned trajectory for the autonomous vehicle.

The trajectory prediction neural network 202 can be trained using a training set of example scene context data and target agent trajectories. In particular, the trajectory prediction neural network 202 can be trained through imitation learning to replicate the target agent trajectories of the training set.

Before training the trajectory prediction neural network 202, the scene encoder neural network 402 can be trained (e.g., pre-trained) to produce the scene encodings 404 using a training dataset of example scene context data. For example, the scene encoder neural network 402 can be pre-trained (e.g., with an appropriate reconstruction loss) to produce scene encodings 404 that suitably encode the scene context data 106 (e.g., by training the network 402 as the encoder of an auto-encoder of the scene context data).

To train the trajectory prediction neural network 202, the training system 122 can quantize target agent trajectories within the training data to produce target sequences of discrete motion tokens. For example, when the token vocabulary 408 includes motion tokens that correspond to deltas for the agent states, the system can quantize an agent trajectory, $\vec{x}_{1:t}$, by first determining a sequence of agent state deltas, $\vec{\Delta x}_{1:t-1}$, that define the trajectory $\vec{x}_{1:t}$ (e.g., in combination with the initial state, $\vec{x}_1$, and then determining a quantized sequence of agent state deltas, $\vec{\Delta x}^Q_{1:t-1}$, where each $$\vec{\Delta x}^Q_i$$

is a delta corresponding to a motion token within the token vocabulary 408 that is closest (e.g., with respect to a distance metric over the deltas) to the corresponding $\vec{\Delta x}_i$.

The scene encoder neural network 402 and the trajectory decoder neural network 406 can be jointly trained or fine-tuned on the training set for the trajectory prediction neural network 202 using an objective function suited to training the trajectory prediction neural network 202 through imitation learning. When training to replicate a target agent trajectory, e.g., the target trajectory $\vec{x}_{1:T}$, the objective function can be to maximize the likelihood of the target sequence of discrete motion tokens corresponding to the target agent trajectory. For example, the objective function can be the following:

$$\mathcal{L} = \prod_{t=1}^{T} p_\theta\left(A_t(\vec{x}_{1:t}) \mid A_{1:t-1}(\vec{x}_{1:t-1}), S_t\right)$$

Where $p_\theta(A_t(\vec{x}_{1:t}) | A_{1:t-1}(\vec{x}_{1:t-1}), S_t)$ is the probability the trajectory prediction neural network 202 assigns to the target motion tokens $A_t$ at the t-th time point, given the sequence of prior target motion tokens, $A_{1:t-1}$ and the scene encoding for the t-th time point, $S_t$.

Figure 5:
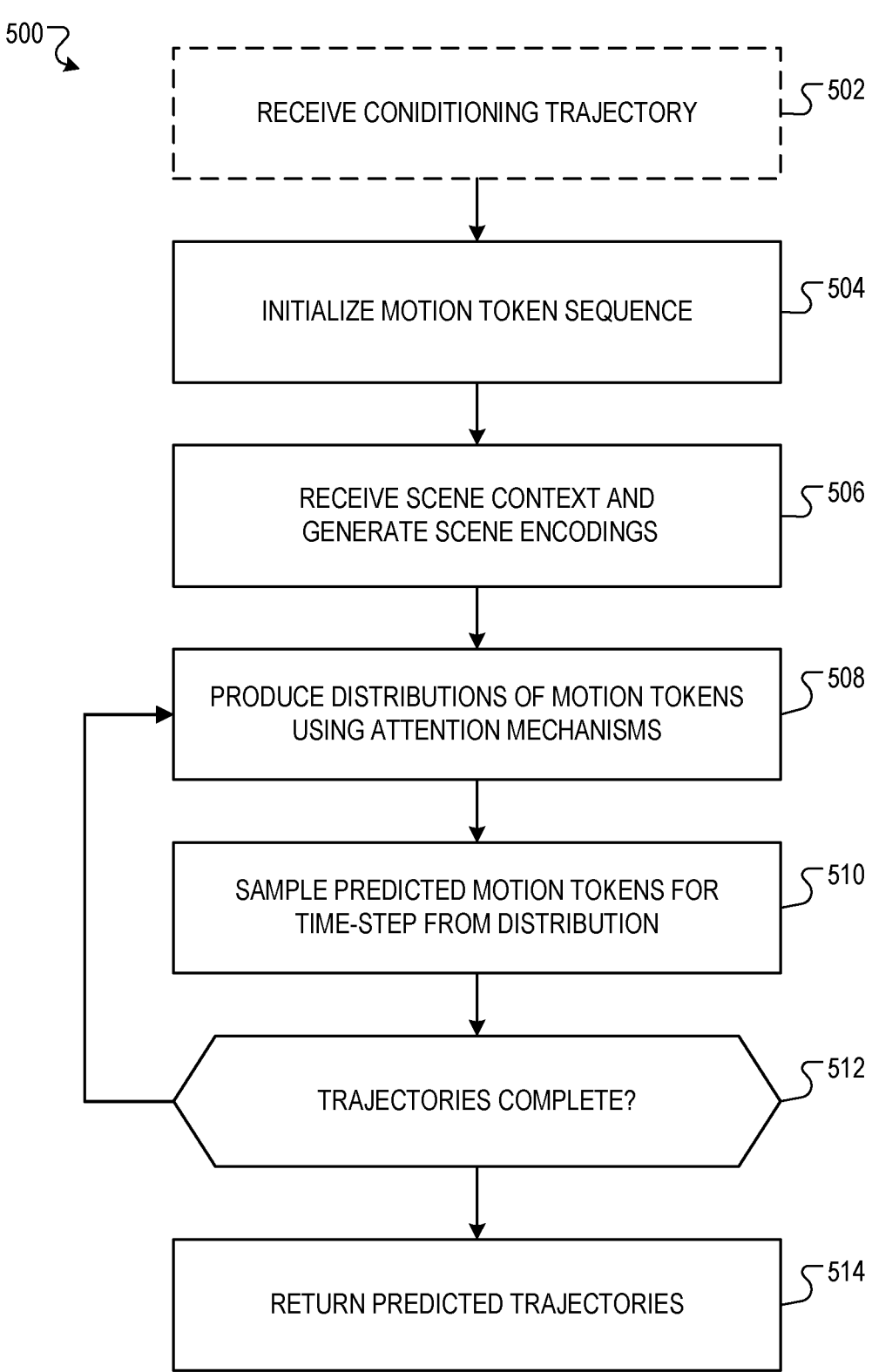
FIG. 5 is a flow diagram of an example process for generating sequences of motion tokens.

FIG. 5 is a flow diagram of an example process for generating a sequence of motion tokens that defines a predicted joint future trajectory for a plurality of agents. For convenience, the process 500 will be described as being performed by a system of one or more computers located in one or more locations. For example, an on-board system, e.g., the on-board system 110 of FIG. 1, appropriately programmed in accordance with this specification, can perform the process 500.

In some implementations, the system can receive a planned future trajectory for a particular one of the plurality of agents (step 502). When the system performs temporally causal conditioning, the system can receive planned future trajectories for one or more conditioning and can determine sets of discrete motion tokens that represent the received planned future trajectories.

The system can initialize a sequence of motion tokens (step 504). As an example, the system can create a sequence of motion tokens and initialize the motion tokens to have any of a variety of appropriate values. For example, the system can initialize one or more motion tokens of the sequence to have values that indicate that the motion token has not yet been predicted. As another example, the system can initialize one or more motion tokens of the sequence to characterize past trajectories of the plurality of agents. As another example, when the system performs temporally causal conditioning, the system can initialize one or more motion tokens of the sequence to characterize received planned future trajectories for one or more conditioning agents.

The system receives scene context data and processes the received context data to produce scene encodings (step 506). The system can process the received scene context data using a scene encoder neural network to generate a respective scene encoding for each of the plurality of agents. In some implementations, the system can generate the respective scene encoding for each agent by generating agent-specific scene context data and processing the agent-specific scene context data using the scene encoder neural network. The system can generate agent-specific scene context data for a particular agent by extracting features from the scene context with respect to a frame of reference of the particular agent.

The system proceeds to generate the motion tokens over a sequence of time steps. At each time step, the system can perform steps 508, 510, and 512 to generate a motion token for the time step, associated with a target agent and a time point for the time step.

At each time step, the system generates a score distribution for the motion token of the time step, where the score distribution specifies scores over a vocabulary of discrete motion tokens (step 508). The system can generate the score distribution by processing an input sequence of motion tokens using a trajectory decoder neural network conditioned on the respective scene encoding for the agent corresponding the particular time step.

The system samples a discrete motion token for the particular time step from the score distribution over the vocabulary of discrete motion tokens (step 510). The system can then add the sampled motion token to the predicted sequence. When the system generates the sequence of motion tokens conditioned on the received planned future trajectory of a particular agent, the system can fix the discrete motion token for the particular agent at the time step to be equal to a corresponding discrete motion token from the set of discrete motion tokens that represent the planned future trajectory.

At each time step, the system can determine whether the predicted trajectory is complete (step 512). As an example, the system can determine that the trajectory is complete after sampling motion tokens for a pre-determined number of time steps. As another example, the system can determine that the trajectory is complete upon determining that the trajectory will complete a particular task, e.g., a navigation task. If the system determines that the trajectory is not complete, the system can continue to generate motion tokens for subsequent time steps.

When the system determines that the trajectory is complete, the system can return the generated sequence of motion tokens (step 514).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining scene context data characterizing a scene in an environment at a current time point; and generating a respective predicted future trajectory for each of a plurality of agents in the scene in the environment at the current time point, the generating comprising:

sampling a sequence of discrete motion tokens that comprises a respective discrete motion token at each of a plurality of time steps and defines a joint future trajectory for the plurality of agents using a trajectory prediction neural network that is conditioned on the scene context data, the sampling comprising:

for a particular time step of the plurality of time steps, sampling the respective discrete motion token at the particular time step from a vocabulary of discrete motion tokens based on processing the discrete motion tokens corresponding to future time points that precede a particular future time point that corresponds to the particular time step using a trajectory decoder neural network conditioned on the scene context data.

2. The method of claim 1, wherein:

the scene context data comprises data generated from data captured by one or more sensors of an autonomous vehicle, and the plurality of agents are agents in a vicinity of the autonomous vehicle in the environment.

3. The method of claim 2, further comprising:

controlling the autonomous vehicle based on the respective predicted future trajectories of the plurality of agents.

4. The method of claim 1, wherein:

each respective future trajectory comprises a respective predicted agent state for the agent at each of a plurality of future time points, the sequence of discrete motion tokens comprises a respective discrete motion token at each of a plurality of time steps, and each time step corresponds to a respective one of the plurality of agents and a respective future time point and the discrete motion token at the time step defines the predicted agent state for the corresponding agent at the corresponding future time point.

5. The method of claim 4, wherein each discrete motion token is selected from a vocabulary of motion tokens that each correspond to a different delta to be applied to a preceding agent state, and wherein the discrete motion token at the time step specifies a delta to be applied to a preceding agent state of the corresponding agent at a preceding time point that immediately precedes the corresponding future time point to generate the predicted agent state for the corresponding agent at the corresponding future time point.

6. The method of claim 4, wherein each respective predicted agent state comprises a predicted two-dimensional waypoint location of the corresponding agent at the corresponding future time point, and wherein each discrete motion token specifies a respective delta value for each of the two dimensions.

7. The method of claim 4, wherein the trajectory prediction neural network comprises (i) a scene encoder neural network.

8. The method of claim 7, wherein sampling a sequence of discrete motion tokens further comprises:

processing the scene context data using the scene encoder neural network to generate a respective scene encoding for each of the plurality of agents; and wherein, for the particular time step of the plurality of time steps, sampling the respective discrete motion token at the particular time step from a vocabulary of discrete motion tokens based on processing the discrete motion tokens corresponding to future time points that precede a particular future time point that corresponds to the particular time step using a trajectory decoder neural network conditioned on the scene context data comprises:

processing an input sequence comprising the discrete motion tokens corresponding to future time points that precede a particular future time point that corresponds to the particular time step using the trajectory decoder neural network while conditioned on the respective scene encoding for the agent corresponding the particular time step to generate a score distribution over a vocabulary of discrete motion tokens; and sampling the discrete motion token for the particular time step from the score distribution over the vocabulary of discrete motion tokens.

9. The method of claim 8, wherein processing the scene context data using the scene encoder neural network to generate a respective scene encoding for each of the plurality of agents comprises:

for each agent, extracting features from the scene context with respect to a frame of reference of the agent to generate agent-specific scene context data and processing the agent-specific scene context data using the scene encoder neural network to generate the respective scene encoding for the agent.

10. The method of claim 8, wherein the trajectory decoder neural network comprises one or more self-attention layers that perform self-attention over the input sequence and one or more cross-attention layers that perform cross-attention into the respective scene encoding for the agent corresponding to the particular time step.

11. The method of claim 8, wherein the trajectory decoder neural network implements temporally causal conditioning such that the discrete motion tokens at each particular time step are sampled conditioned only on discrete motion tokens corresponding to future time points that precede the future time point that corresponds to the particular time step and not any discrete motion tokens corresponding to future time points that are after the future time point that corresponds to the particular time step.

12. The method of claim 1, further comprising:

sampling one or more additional sequences of discrete motion tokens that each define a respective additional joint future trajectory for the plurality of agents using the trajectory prediction neural network that is conditioned on the scene context data; and aggregating a plurality of joint future trajectories comprising the joint future trajectory and the additional joint future trajectories to generate (i) a plurality of predicted trajectory modes and (ii) a respective probability for each predicted trajectory mode.

13. The method of claim 12, wherein the plurality of joint future trajectories comprise a plurality of further joint future trajectories that are each defined by a respective further sequence of discrete motion tokens generated by a respective replica of the trajectory prediction neural network that is conditioned on the scene context data.

14. The method of claim 1, wherein the trajectory prediction neural network has been trained through imitation learning.

15. The method of claim 1, further comprising:

receiving a planned future trajectory for a particular one of the plurality of agents; and determining a set of discrete motion tokens that represent the planned future trajectory, wherein sampling a sequence of discrete motion tokens that defines a joint future trajectory for the plurality of agents using a trajectory prediction neural network that is conditioned on the scene context data comprises fixing each discrete motion token in the sequence that correspond to the particular agent to be equal to a corresponding discrete motion token from the set of discrete motion tokens that represent the planned future trajectory.

16. A system comprising:

one or more computers; and one or more storage devices storing instructions that, when executed by the one or more computers, cause the one or more computers to perform operations comprising:

obtaining scene context data characterizing a scene in an environment at a current time point; and generating a respective predicted future trajectory for each of a plurality of agents in the scene in the environment at the current time point, the generating comprising:

sampling a sequence of discrete motion tokens that comprises a respective discrete motion token at each of a plurality of time steps and defines a joint future trajectory for the plurality of agents using a trajectory prediction neural network that is conditioned on the scene context data, the sampling comprising:

for a particular time step of the plurality of time steps, sampling the respective discrete motion token at the particular time step from a vocabulary of discrete motion tokens based on processing the discrete motion tokens corresponding to future time points that precede a particular future time point that corresponds to the particular time step using a trajectory decoder neural network conditioned on the scene context data.

17. The system of claim 16, wherein:

the scene context data comprises data generated from data captured by one or more sensors of an autonomous vehicle, and the plurality of agents are agents in a vicinity of the autonomous vehicle in the environment.

18. The system of claim 17, the operations further comprising:

controlling the autonomous vehicle based on the respective predicted future trajectories of the plurality of agents.

19. The system of claim 16, wherein:

each respective future trajectory comprises a respective predicted agent state for the agent at each of a plurality of future time points, the sequence of discrete motion tokens comprises a respective discrete motion token at each of a plurality of time steps, and each time step corresponds to a respective one of the plurality of agents and a respective future time point and the discrete motion token at the time step defines the predicted agent state for the corresponding agent at the corresponding future time point.

20. One or more computer-readable storage media storing instructions that when executed by one or more computers cause the one or more computers to perform operations comprising:

obtaining scene context data characterizing a scene in an environment at a current time point; and generating a respective predicted future trajectory for each of a plurality of agents in the scene in the environment at the current time point, the generating comprising:

sampling a sequence of discrete motion tokens that comprises a respective discrete motion token at each of a plurality of time steps and defines a joint future trajectory for the plurality of agents using a trajectory prediction neural network that is conditioned on the scene context data, the sampling comprising:

for a particular time step of the plurality of time steps, sampling the respective discrete motion token at the particular time step from a vocabulary of discrete motion tokens based on processing the discrete motion tokens corresponding to future time points that precede a particular future time point that corresponds to the particular time step using a trajectory decoder neural network conditioned on the scene context data.

* * * * *